United States Patent [19]

Messing et al.

[11] Patent Number: 4,562,848

[45] Date of Patent: Jan. 7, 1986

[54] CAR CLEANING SYSTEM FOR CAR WASHES

[75] Inventors: Horst Messing, Lindlar, Fed. Rep. of Germany; Jospeh Enning, Charlottesville, Va.

[73] Assignee: Mr. Wash Auto-Service AG, Düsseldorf, Fed. Rep. of Germany

[21] Appl. No.: 607,850

[22] Filed: May 7, 1984

[30] Foreign Application Priority Data

Nov. 18, 1983 [DE] Fed. Rep. of Germany ....... 3341650

[51] Int. Cl.[4] ............................................... B60S 3/06
[52] U.S. Cl. .................................... 134/123; 15/53 A; 15/53 AB; 15/DIG. 2
[58] Field of Search ................ 134/45, 123; 15/53 R, 15/53 A, 53 AB, DIG. 2

[56] References Cited

U.S. PATENT DOCUMENTS 2,708,446  5/1955  Phillips ................................. 134/123
3,459,203  8/1969  Pritchard ............................. 134/123

FOREIGN PATENT DOCUMENTS 196564  7/1967  U.S.S.R. ........................ 15/DIG. 2

*Primary Examiner*—Edward L. Roberts
*Attorney, Agent, or Firm*—Martin A. Farber

[57] ABSTRACT

In a car cleaning system for car washes having a car conveying device, a cleaning element which extends transversely to the direction of travel of the car. The cleaning element is held at its ends on a pair of lever arms which are swingable about a fixed swivel joint and can be changed in position in a manner corresponding to the contour of the car as viewed from the side of the car. The pair of lever arms is swingably guided in such a way that at the start of the cleaning process the lever arms are inclined obliquely downwardly in the direction opposite the direction of travel of the car and at the end of the cleaning process they are inclined obliquely downwardly in the same direction as the direction of travel of the car, terminating approximately in the region of the bottom of the car. The cleaning element is arranged for translation on the pair of lever arms, and is movable in such a manner that both at the beginning and at the end of the cleaning process it is at the lower end of the lever arms.

8 Claims, 14 Drawing Figures

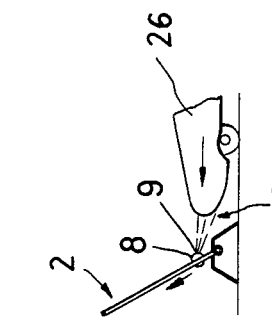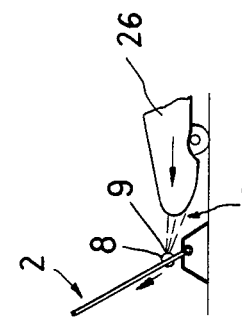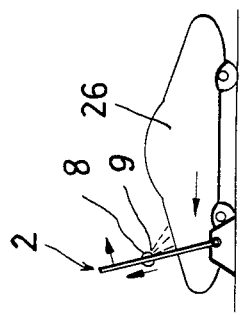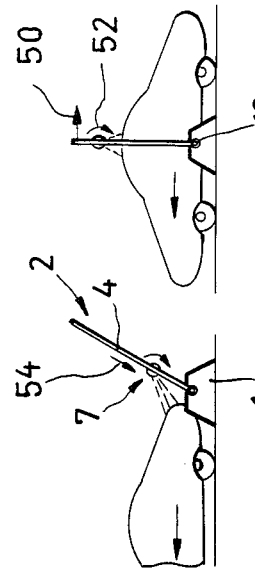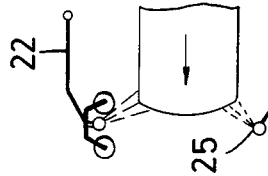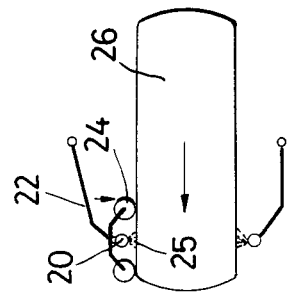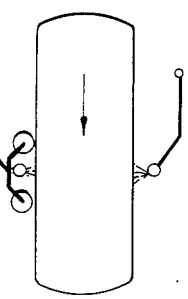

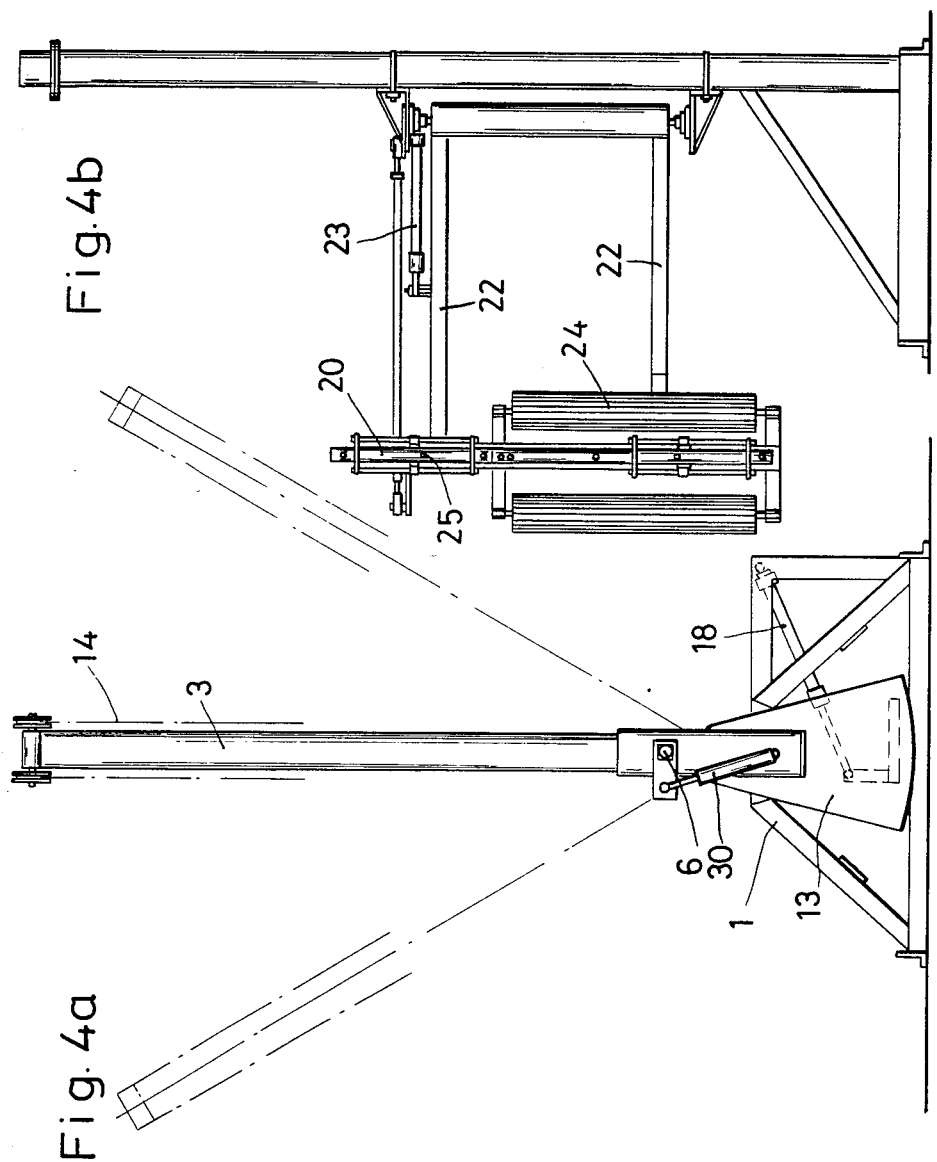

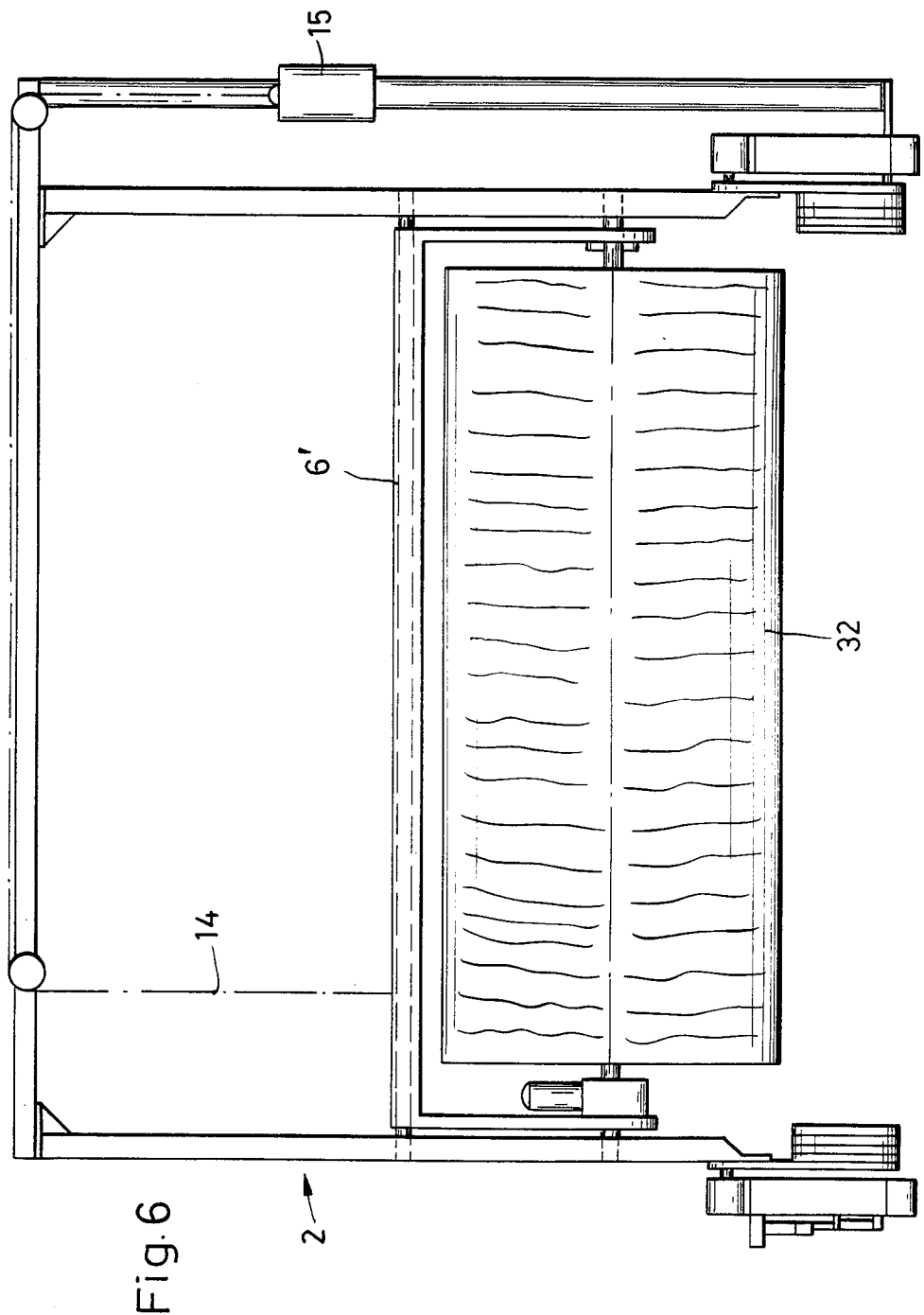

CAR CLEANING SYSTEM FOR CAR WASHES

BACKGROUND OF THE INVENTION

The present invention relates to a car cleaning system for car washes having a car conveying device, and more particularly, comprising a car cleaning system having a cleaning element which extends transversely to the direction of conveyance of the car and is held at its ends on a pair of lever arms each of which is swingable about fixed swivel joints and can be changed in position by said pair of arms in a manner corresponding to the contour of the car as seen from the side.

PRIOR ART

There are fundamentally two different types of automatic car washes. On the one hand, there is the type of portal car wash in which the vehicle to be washed stands still and the washing brushes which are arranged on a portal are moved along the car. On the other hand, there are wash lines in which a car is pulled through the car wash by means of a conveyor belt. In the latter case the washing devices are arranged fixed in position along the direction of travel of the car.

In the last-mentioned wash lines it is difficult to achieve a uniform, intensive cleaning of the car over the front, roof and rear surfaces thereof. This is because the time which the horizontally extending cleaning brushes remain applied is relatively longer in the region of the horizontal car surfaces than in the region of the vertical car surfaces, as seen from the side of the vehicle. This is particularly serious in the front and rear regions of the car, while it is just these regions which become dirtiest in highway traffic.

Also unsatisfactory are known brush rollers or spray pipes for flushing away residues of cleaning agent, which extend transversely to the direction of conveyance of the car, where satisfactory cleaning can be obtained therewith only in the region of those car surfaces which extend relatively horizontally.

Further cleaning problems are experienced in connection with the so-called notch backs of automotive vehicles. These backs are contoured to drop down very steeply from the rear edge of the roof. As a result, follow-up cleaning devices must be employed, such as brush rollers. Within the use of such brush rollers, it is known to adapt a pair of lever arms consisting of double-arm levers arranged swingably through an approximately horizontal zero position about a fixed swivel joint arranged above the car. Rocker-like support arms are suspended from the lever-arms which point in the direction of travel of the car. The free end of these arms receive a rotatable brush roller. Counter-weights are provided on the opposite ends of the lever arms. When the front of a car which is to be cleaned reaches the rotating brush roller, the pair of lever arms begins to move the brush roller corresponding to the contour of the forward-moving car. In this connection the rocker-like support arms of the brush roller are held in vertical position by piston-cylinder units until the brush roller is at the highest point of the contour of the car. By actuation of the piston-cylinder unit the support arms of the brush roller are now pulled obliquely rearwardly by about 45° so that the brush roller stays a comparatively short time in this region of the car; furthermore, the moments of rotation on the swivel joints of the pair of lever arms change considerably in this connection. As soon as the brush roller reaches the rear edge of the roof of the car, it is lowered again by the pair of lever arms. At the same time, the brush roller is moved, as a function of the steepness of the rear part of the car, by means of the piston-cylinder units in the direction of travel of the car by the support arms. This movement is greatest in the region of the greatest steepness of the rear of the car.

This known car-cleaning system has the disadvantage, however, that the sharply descending front and rear parts of the car still cannot be fully cleaned down to their lowest point. In particular, the bumpers and especially the regions of the front and rear located below the bumpers can not be reached at all by the roller brush. Also, the brush roller stays for different lengths of time in different regions of the surface of the car to be cleaned, which cannot be avoided.

SUMMARY OF THE INVENTION

It is therefore an object of the present invention to create a car-cleaning system of the introductory-mentioned type by means of which a more intensive cleaning, particularly of the vertical surfaces of the car, is possible.

It is a further object of the present invention that the cleaning process in a car wash should commence way down at the bottom of the front portion of the car and terminate just as far down on the rear portion of the car.

The present invention is directed to an improved cleaning apparatus to achieve more complete cleaning of a car moving through a carwash, including the cleaning of the lower-most portions below the front and rear bumpers of the car being cleaned. The cleaning commences at the bottom of the front of the car and terminates at the bottom of the rear portion of the car. The above is possible by installing of a brush in the portal.

In accordance with the present invention the brush is supported by a pair of lever arms. These lever arms are guided swingably in such a manner that at the start of the cleaning process the lever arms are inclined obliquely downwardly opposite the direction of travel of the car while at the end of the cleaning process they are inclined obliquely downwardly in the same direction as the direction of travel of the car terminating approximately in the region of the bottom of the car. The cleaning element is arranged on the pair of lever arms, and is so movable that it is at the lower end of the lever arms both at the beginning and at the end of the cleaning process.

In one embodiment of the present invention, the free ends of the lever arms are operatively connected together so as to form a portal and the axis of swing of said portal is located in the vicinity of the path of travel of the car. In this way a synchronous swinging of the two lever arms is possible by a single drive without the movement of the vehicle being thereby impeded.

If, in accordance with a further embodiment of the present invention, the cleaning element comprises cleaning nozzles which are arranged for swinging about its axis in a manner corresponding to the contour of the car, then a particularly intensive cleaning by high pressure jets can be obtained. It is also possible to operate such nozzles with compressed air in order, in this way, to remove residue of cleaning substance and cleaning liquid from the car. In particular, if the cleaning nozzles are arranged in accordance with the invention for oscillation along the length of the cleaning element, then cleaning nozzles can be used which only small elements of the surface, but clean them particularly throughly. Such an arrangement of cleaning nozzles which are spaced apart from each other along a line and are arranged for individual or joint oscillation along the length of the cleaning element can in principle also be used for the cleaning of the vertical side surfaces of the car.

In accordance with a further embodiment of the present invention, photocells are arranged laterally of the cleaning element and are spaced laterally from its axis to permit non-contact guidance of the cleaning element along the contour of the car at an exact distance from same. The photocells, with cleaning elements which are swingable about their longitudinal axis, are to be swingable synchronously so that the swinging movement of the cleaning element can also be performed in a manner which corresponds to the contour of the car.

In accordance with still another embodiment of the present invention, the pair of lever arms comprises double-arm lever arms with balancing weights on those lever arms which point away from the cleaning element. Thus the entire car cleaning system is in a completely balanced state in every position of inclination of the lever arms so that only small forces are necessary for its movement. The same effect is obtained with respect to the movement of the cleaning element along the lever path of the pair of lever arms where a counterweight is provided which is coupled with the cleaning element and can move along the lever path of the pair of lever arms.

SHORT FIGURE DESCRIPTION OF THE DRAWINGS

Further objects, features and advantages of the invention can be noted from the following description of the accompanying drawings which show several preferred embodiments of a car cleaning system in accordance with the present invention, in which:

FIG. 1 is a front elevational view partly broken away of a car cleaning system transverse to the direction of conveyance of the car viewed in the direction of the arrow A in FIG. 5a;

FIG. 1a is an enlarged broken away sectional view corresponding to FIG. 1 showing details;

FIG. 1b is a section along the lines 1b of FIG. 1a;

FIG. 1c is a section along the lines 1c of FIG. 1a;

FIG. 1d is a broken away detail of FIG. 1a;

FIG. 3a–3g shows in diagrammatic form the manner of operation of a car cleaning system in accordance with FIGS. 1 and 2;

FIGS. 4a and 4b are side views of the embodiment of FIGS. 1 and 2, respectively viewed in the direction of the arrow B in FIG. 5b;

Figure 1:
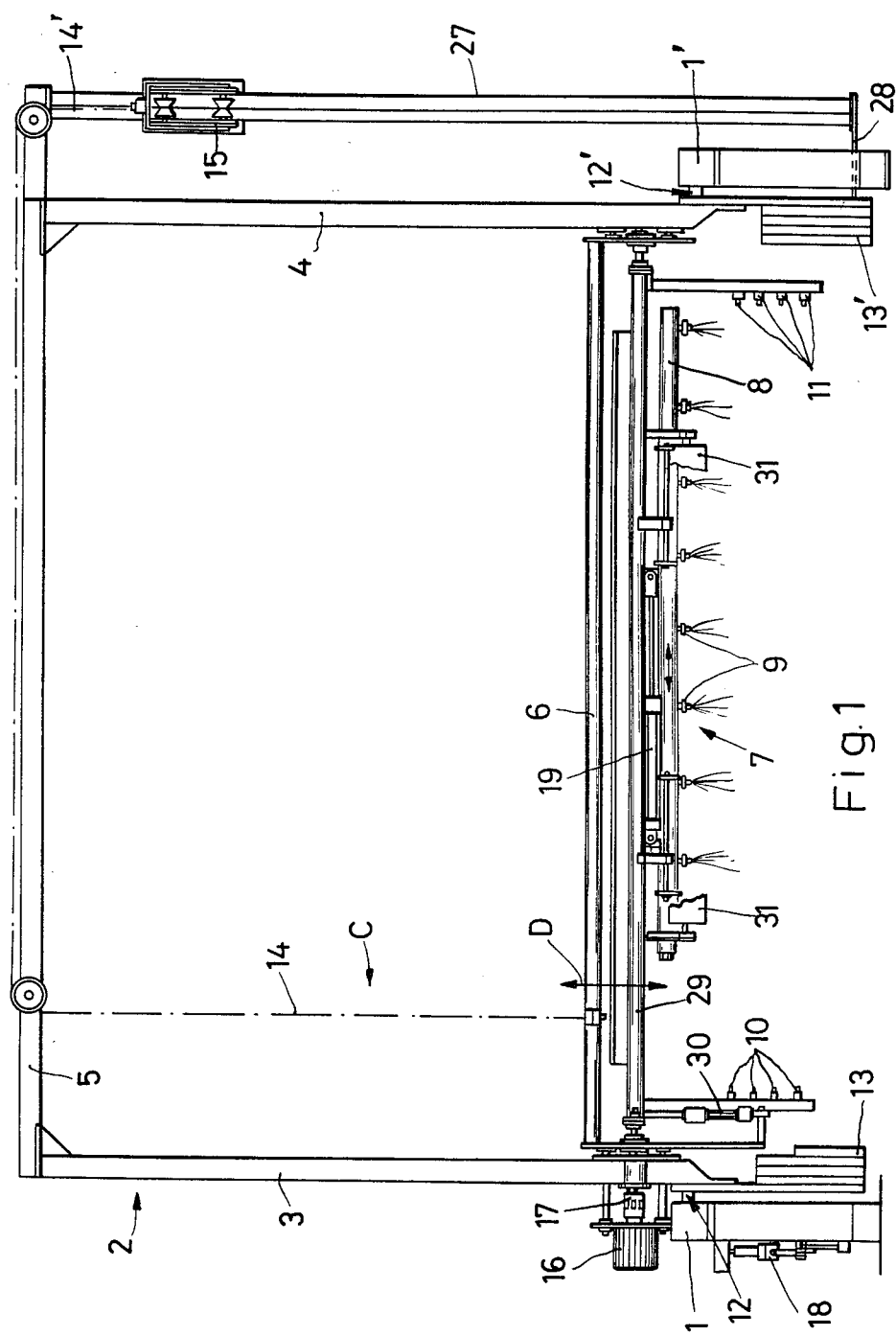
Figure 2:
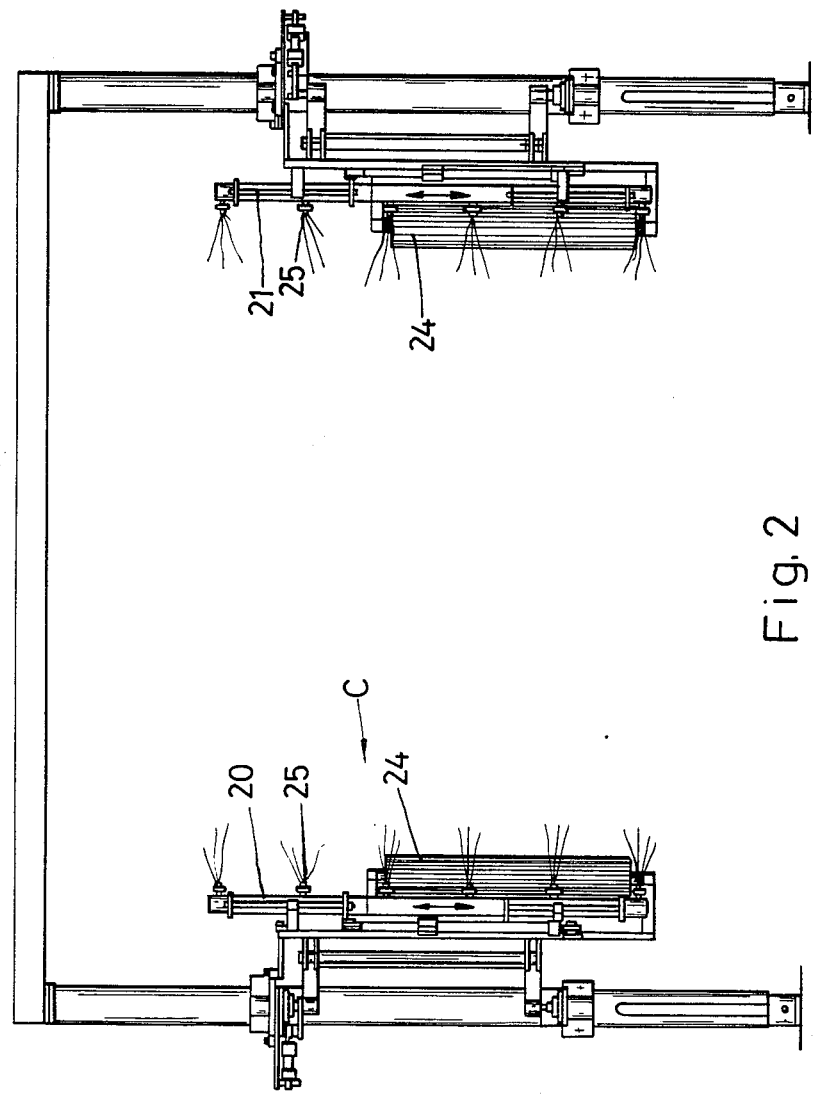
FIG. 2 shows a front view of a supplementary car cleaning system in a view similar to that of FIG. 1 viewed in the direction of the arrow B in FIG. 5b.
Figure 5A:
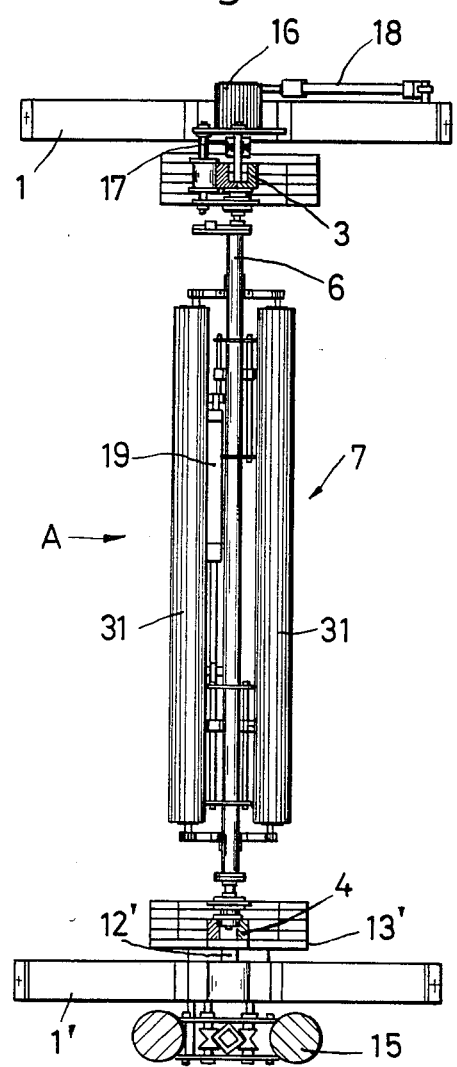

FIGS. 5a and b are top views partly in section of the embodiment of FIGS. 1 and 2, respectively; and FIG. 6 shows another embodiment of the present car cleaning system in a view similar to that of FIG. 1.

DETAILED DESCRIPTION OF THE PREFERRED EMBODIMENTS

Referring to FIGS. 1 and 5a, a portal 2 which is swingable around bearing blocks 1, 1', comprises a pair of lever arms comprising double-arm straight levers 3, 4, the free upper ends of which are connected to a yoke 5. In FIG. 1, a cross member 6, having a cleaning element 7 which extends along the length of the member 6, is displaceably guided at the ends of the member 6 along the lever arms 3, 4 in the direction indicated by the arrow D.

The cleaning element comprises a nozzle pipe 8 which is swingable about the axis of the cross member 6 and is provided with nozzles 9 for high-pressure fluid for cleaning a car. Photocells 10, 11 are arranged on the ends of the cross member 6 and are also swingable together with the nozzle pipe 8. The photocells 10, 11 may comprise two sets of four photocells each, as shown in FIG. 1, providing the function explained later.

As further shown in FIG. 1, balancing weights 13, 13' are provided on the portal 2 below swivel joints 12, 12'. The weight of the vertically movable cross member 6 together with the nozzle pipe 8 and the photocells 10, 11 is counter-balanced by a counter-weight 15 via ropes 14, 14'. Counter-weight 15 travels on a travel rail 27, the rail 27 being fastened to the yoke 5 and, by means of a strut 28, to the associated balancing weight 13'.

The vertical drive of the cross member 6 is effected by means of a hydraulic motor 16 with a clutch 17 via two gears and two racks. The gears are seated on a shaft which extends within a square pipe 29, and mesh with the two racks, which are provided on the lower arms 3, 4. The shaft bearing the gears is driven by the hydraulic motor 16.

The portal 2 is swung by a hydraulic piston-cylinder unit 18, as indicated in FIG. 4a.

The oscillating movement of the nozzle pipe 8 is produced by means of a piston-cylinder unit 19.

As shown in FIGS. 2 and 5a, to the left and right of the car to be washed (not itself shown) nozzle pipes 20, 21 are swingable towards the car. These pipes oscillate in a vertical direction. As shown in FIG. 4b, the movement of these nozzle pipes towards the car is effected by swing arms 22 by means of a piston-cylinder unit 23. Sensing contact rollers 24 keep the side nozzles away from the car.

By means of the photocells 10, 11, which are arranged transversely to the car, or a floor switch (not shown), the beginning and end of the car are detected and whereupon the side nozzles are swung towards and away from the car, respectively.

In the horizontal nozzle pipe 8 there are nine nozzles 9, as indicated in FIG. 1, while in each of the vertical nozzle pipes 20, 21 there are six nozzles 25, as seen in FIG. 2.

Figure 5B:
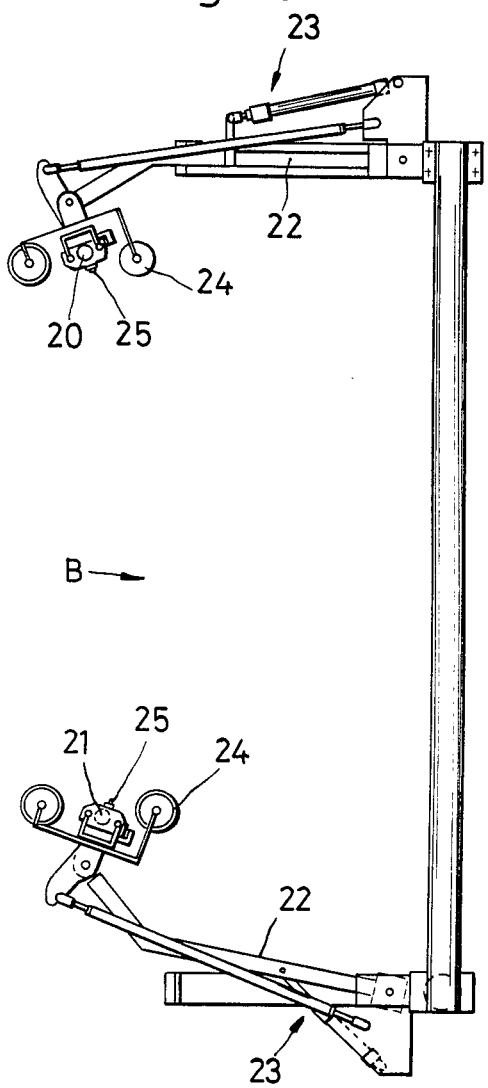

The operation of the car cleaning system of the present invention will now be described in conjunction with FIGS. 3a, 3b, 3c, 3d, in sequence. FIGS. 3a, 3b, 3c, 3d represent an embodiment such as for example in FIG. 4a, in operation, while FIGS. 3e, 3f, 3g, represent an embodiment such as in FIG. 5b, in operation. The portal 2 is, in its starting position, swung away from the incoming car. The lateral swing arms 22 are swung away from the incoming car in the starting position. The cross member carrying the nozzle pipe 8 is now located in its lowermost position. The nozzles 9 are directed towards the on-coming car. When the car reaches the position of the lateral nozzle 25 (FIG. 3a, the nozzles 25 swing towards the car 26 and oscillation commences.

When the car 26 now reaches the photocells 10, 11 on the cleaning element 7, the cross member 6, driven by the hydraulic motor 16, starts to move upwardly in the portal 2 while a cleaning fluid 40 which is under high pressure acts on the front of the car 26. By, in each case, the four photocells 10, 11 arranged one behind the other, in combination with a proportional valve, the nozzles 9 to move over the contours of the car 26 without touching same (FIG. 3b).

When the cross member 6, and thus the nozzle pipe 8 which is oscillating during the entire time, has reached approximately the height of the windshield of the car, the portal 2 will slowly begin to swing by means of the piston-cylinder unit 18 in the direction opposite the direction of travel of the car as indicated by the arrow 50, see FIGS. 3b, 3c. At the same time the nozzle pipe 8, driven by the piston-cylinder 30 (seen in FIG. 1), swings in the direction towards the surface of the car on which the nozzles are to act as indicated by the arrow 52 in FIG. 3c.

When the portal 2 is in an end position which is swung past the vertical, opposite the direction of travel of the car, as seen in FIG. 3d1, the cross member 6 slides downwardly, as indicated by arrow 54. Due to the inclined position of the portal 2 and of the correspondingly swung nozle pipe 8, as seen in FIG. 3d, the nozzles 9 follow the car 26 as it moves away. When the cross member 6 has reached its lowermost position, the portal swings into its starting position and the nozzle pipe 8 is directed towards the next arriving car. The lateral nozzles 25 move into their initial position as soon as the car has left their range of spraying.

In practice of the present invention, the cleaning process on the front of the car can start very far down and, due to the obliquely upward movement of the nozzle pipe 8 (away from the car), the front region of the car 26 can be cleaned for a sufficiently long period of time and sufficiently thoroughly. The cleaning process is thus more intensive. By the swinging of the nozzle pipe 8 and the portal 2 an effective follow-up motion is obtained. The photocells 10, 11 at all times maintain a safe distance, free of contact relative to the car. The nozzles 9 follow the contour of the car precisely up to the position of the rear bumper. Furthermore, sensor contact rollers 31 at the sides of the nozzle pipe 8 prevent the nozzles 9 from damaging the car.

In an alternative embodiment, instead of the nozzle pipe 8, a rotating brush roller 32, as seen in FIG. 6, can also be employed. In such case, the shaft having the two gears which travel along the racks on the lever arms 3, 4 is located in the higher cross member 6'. In this way canting of the cross member is avoided. The counterweight 15 is so designed that the brush roller 32 rolls downwardly under its own weight. Due to the oblique position of the portal 2, the brush roller 32 is raised by the car 26 and, after the swinging of the portal, follows the car down into the lowermost position.

It is to be understood that the above-described embodiments are merely illustrative of the application of the principles of the invention. Numerous variations may be devised by those skilled in the art without departing from the spirit or scope of the present invention.

We claim:

1. A car cleaning apparatus, of the type where a car to be cleaned is conveyed in a path of travel of said car through the apparatus, comprising:
   a pair of lever arms having a lower end and an upper end, and being pivotally mounted adjacent the lower end;
   a cleaning element extending transverse to the path of travel of said car through the apparatus and being mounted moveably up and down said lever arms defining a travel path on said lever arms;
   said cleaning element being pivotally mounted with respect to said pair of lever arms;
   first means for moving said cleaning element from a lower end of said travel path of said lever arms at the beginning and end respectively of the cleaning process,
   second means for swinging said pair of lever arms to swing away from the car to a position extending obliquely downwardly opposite the direction of conveyance of the oncoming said car at the start of said cleaning process and to swing away from the car in a position extending obliquely downwardly to the same direction as the direction of conveyance of said car at the end of said cleaning process, respectively, and
   third means for pivoting said cleaning element with respect to said pair of lever arms.

2. The car cleaning apparatus according to claim 1, further comprising:
   a swivel joint located in the vicinity of a conveyance track-way of the apparatus, said pair of lever arms being pivotally mounted about said swivel joint; and
   each of said lever arms further comprising an upper free end, said free ends of said lever arms being operatively connected to form a portal.

3. The car cleaning apparatus according to claim 1, wherein
   said cleaning element further comprises cleaning nozzles.

4. The car cleaning apparatus according to claim 3, wherein
   said cleaning nozzles are arranged for oscillation along the length of said cleaning element.

5. The car cleaning apparatus according to claim 1, further comprising
   photocells arranged laterally to the cleaning element and spaced laterally from the axis of travel thereof and operatively connected to said first and said third means.

6. The cleaning apparatus according to claim 1, further comprising:
   balancing weights;
   wherein said pair of lever arms comprises two double-arm lever arms having ends disposed away from said cleaning element; and
   wherein said balancing weights act upon said ends of said double-arm lever arms to balance said lever arms.

7. The car cleaning apparatus according to claim 1, further comprising
   a counter-weight, said counter-weight being coupled to said cleaning element and being translatable along the travel path of the lever arms.

8. The car cleaning apparatus according to claim 6, further comprising
   a counter-weight, said counter-weight being operatively connected to said cleaning element and being translatable along the travel path of said lever arms.

* * * * *